United States Patent
Gadge et al.

(10) Patent No.: US 11,650,845 B2
(45) Date of Patent: May 16, 2023

(54) COMPUTATION SHARING AMONG DEVICES USING DEVICE OS CLUSTERING

(71) Applicant: International Business Machines Corporation, Armonk, NY (US)

(72) Inventors: Vaibhav Vijay Gadge, Pune (IN); Hugh Edward Hockett, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/323,241

(22) Filed: May 18, 2021

(65) Prior Publication Data

US 2022/0374261 A1 Nov. 24, 2022

(51) Int. Cl.
*G06F 9/48* (2006.01)
*G16Y 40/30* (2020.01)
*G16Y 20/20* (2020.01)
*G06F 9/4401* (2018.01)

(52) U.S. Cl.
CPC .......... *G06F 9/4856* (2013.01); *G06F 9/4406* (2013.01); *G16Y 20/20* (2020.01); *G16Y 40/30* (2020.01)

(58) Field of Classification Search
None
See application file for complete search history.

(56) References Cited

U.S. PATENT DOCUMENTS

| 9,692,821 B2 | 6/2017 | Kuscher | |
| 2006/0080668 A1* | 4/2006 | Blackmore | G06F 9/544 |
| | | | 719/312 |
| 2015/0281336 A1* | 10/2015 | Beale | G06F 9/5088 |
| | | | 709/201 |
| 2016/0140359 A1 | 5/2016 | Mukherjee | |
| 2019/0238625 A1* | 8/2019 | Baughman | H04L 67/10 |
| 2020/0110641 A1 | 4/2020 | Hollinger | |
| 2020/0244297 A1 | 7/2020 | Zalewski | |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.
Milojicic, et al., "Process Migration", Hewlett Packard, Dec. 5, 1998, 50 pgs.
International Searching Authority, Notification of Transmittal of the International Search Report and the Written Opinion of the International Searching Authority, or the Declaration, International Application No. PCT/EP2022/062262, International filing date: May 6, 2022, dated Aug. 23, 2022, 12 pgs.

* cited by examiner

*Primary Examiner* — Kevin T Bates
*Assistant Examiner* — Emad Siddiqi
(74) *Attorney, Agent, or Firm* — Jared L. Montanaro (57) ABSTRACT

A processor may identify an action of a first device of the IoT devices. The processor may initiate a transfer from the first device to one or more other devices of the IoT devices. The processor may pause each thread being executed by the first device and the one or more other devices. The processor may transfer a unit from the first device to the one or more other devices.

8 Claims, 6 Drawing Sheets

COMPUTATION SHARING AMONG DEVICES USING DEVICE OS CLUSTERING

BACKGROUND

The present disclosure relates generally to the field of the Internet-of-Things (IoT), and more specifically to efficient computation sharing among multiple IoT devices using device operating system (OS) clustering.

Currently, there are more connected IoT devices in the world than there are all people combined, and the number of IoT devices is growing further. Each IoT device has a specific heterogeneous computing power, and has a specific primary purpose, or program, to execute. Consequently, more devices are adding up, and with more programs, more computing power is being used. Still though, most IoT devices have a single primary program to run and usually, only, for a specific period. Most of the devices do not run 100% of their computing capacity and/or do not run all the time (e.g., remain idle for rest of time).

SUMMARY

Embodiments of the present disclosure include a method, computer program product, and system for sharing efficient computation among multiple IoT devices using device OS clustering. A processor may identify an action of a first device of the IoT devices. The processor may initiate a transfer from the first device to one or more other devices of the IoT devices. The processor may pause each thread being executed by the first device and the one or more other devices. The processor may transfer a unit from the first device to the one or more other devices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of the IoT, and more specifically to efficient computation sharing among multiple IoT devices using device OS clustering. While the present disclosure is not necessarily limited to such applications, various aspects of the disclosure may be appreciated through a discussion of various examples using this context.

Currently, there are more connected IoT devices in the world than there are all people combined, and the number of IoT devices is growing further. Each IoT device has a specific heterogeneous computing power, and has a specific primary purpose, or program, to execute (e.g., mobile, TV, refrigerator, smart watch, etc.). Consequently, more devices are adding up, and with more programs, more computing power is being used. Still though, most IoT devices have a single primary program to run and usually, only, for a specific period. Most of the devices do not run 100% of their computing capacity and/or more importantly do not run all the time (e.g., remain idle for rest of time).

Accordingly, at a high level, if for a computation, the dependency of a specific hardware computation is removed, it would bring a substantial benefit to a system. Discussed through this disclosure are solutions to bring this substantial benefit to the system. Proposed is a solution that provides a way to make a cluster of the operating systems of multiple IoT (e.g., computing) devices in a such way that the system/network utilizes the computing power of idle devices in order to share collective computing power. The solution manages processes on multiple IoT devices and moves/places/transfers/rebalances running processes to other member devices of a cluster based on an overall resource utilization of the IoT devices in the cluster.

In some embodiments, the proposed solution provides a clustering of an operating system(s) for one or more computing devices. The computing devices work like a cluster member and are controlled by a cluster manager program in such a way that it efficiently distributes and transfers the computation among devices. In such an embodiment, each (IoT) device would run a proposed OS program, which would control, move, stop, and/or start any program on the devices and coordinate with a manager program (e.g., a cluster manager) on the same, or another device, in a such a way that it will share/manage a computation load.

In some embodiments, all the participant device operating systems work like a member of a cluster coordinated by the cluster manager in a such way that:

The cluster manager program will run on any member IoT device with an option of high availability (HA) on one or more additional devices (e.g., quorum of IoT devices running the cluster manager);

The cluster manager program will control/add/remove/update devices to a cluster with respect to computation. In some embodiments, a user may manually approve the addition of new members to the cluster in a home environment. Or, in a public environment a device can subscribe to an organized service where it can automatically join and leave (and potentially be paid for its processing usage over time [e.g. cars in a car parking garage clustering together for a temporary super computer during the day]);

The cluster manager program will control an increase and/or decrease of a memory and computation footprint without hindering a primary program's performance on/of any device;

The cluster manager program will establish trust relationships between devices in the cluster so that processes can be securely transferred directly between devices using the network;

The cluster manager program will manage the transfer of any running process between member devices based on load, policy, priority, efficiency, processor architecture, etc.;

The cluster manager program can support an HA feature for running any critical program on multiple devices, including the replication of memory and storage synchronously while the processes are running, so that if a device is unplugged it can continue running in parallel on another device;

In some embodiments, in the proposed OS on the IoT devices, the proposed OS includes a primary algorithm of a device function, secondary programs allotted by the cluster manager, and the proposed OS would track the exact instruction line (of code) in each thread that is being executed at any point of time, along with each variable and its values. In such a way, it can directly jump to any line of code and start execution with its prerequisite, like, variables data and libraries; and In some embodiments, a component (Program: Transfer unit), utilizes the information of the line of code and variable data, and transfers one or more computations from one computation unit to other computation unit. A receiver device system/computation unit may use the information and may continue the processing from a subsequent line where it was left from a previous computation unit.

Accordingly, a component may identify the current processing line in code in/by an algorithm, along with variables, and the component transfers the line and variables to other, next device that takes over and starts process execution. This solution enables the transfer of a computation of any algorithm that is midway from one IoT device to other IoT device in automatic fashion. Every time the computation moves to other new system, the computation picks up exactly where it stopped on the previous system, thus, no repetition.

It is noted that, many IoT computing devices are collecting data that may be used for various purposes, but this data needs to be processed in real-time and used for various purposes. Particularly, in next generation devices, there may be a cluster of many devices, such as, idle laptops, smartphones, TVs, refrigerators, washing machines, or many type of sensor devices capturing data and having computation power. Irrespective of which device captured the data, the data can be processed by other nearby devices and produce output instantly; all without hindering any devices primary purpose and reducing dependency on external far-off computation systems with latency.

For ease of understanding, before turning to the FIGS., discussed below are various use cases for how the proposed solution can be achieved and utilized. For example, a user may want to play a game on their tablet (e.g., where the game needs heavy computation), or run a prediction algorithm based on real-time data on their laptop, or implement any edge computing application where instant results are expected with no latency without cloud, slow, or no, internet; one can use idle computation power of cluster devices around it with proposed solution provided herein.

Further, the proposed solution could be applicable to health care systems, automotive, manufacturing, or even home based, appliances. As another example, next generation home refrigerator sensors collected data that needs to be processed (e.g., running an analytics algorithm to generate future prediction, and report, for next procurement item list). In this instance, historical data would need to be processed. The refrigerator would use home (e.g., of a home network, WiFi, etc.) computation power of an idle laptop or gaming console (e.g., which has high computation power), or even a mobile device, or any devices at home.

In another example, most next generation cars have a computation unit with an OS. Due to this, car parking (in a parking garage, lot, etc.) could be utilized as a huge hub of computation capacity with hundreds of cars working together. A temporary super computer could be made during a work day with cars in a parking garage, and individual cars could be paid for their processing usage during the day.

In yet another example, there could be next generation devices that have very little computation capacity and always relies on external computation, such as, modular sensor instruments in a plant, kitchen appliances like a microwave oven, a timer based stove, a wireless meter reading instrument etc. for advance usage.

In some embodiments, regardless of if a homebased example or external example is implemented, a user may opt-in to allowing their devices to communicate with other devices. And the implementations may be protected on a private (e.g., blockchain, cloud, etc.) network where encryption can be used.

Figure 1A:
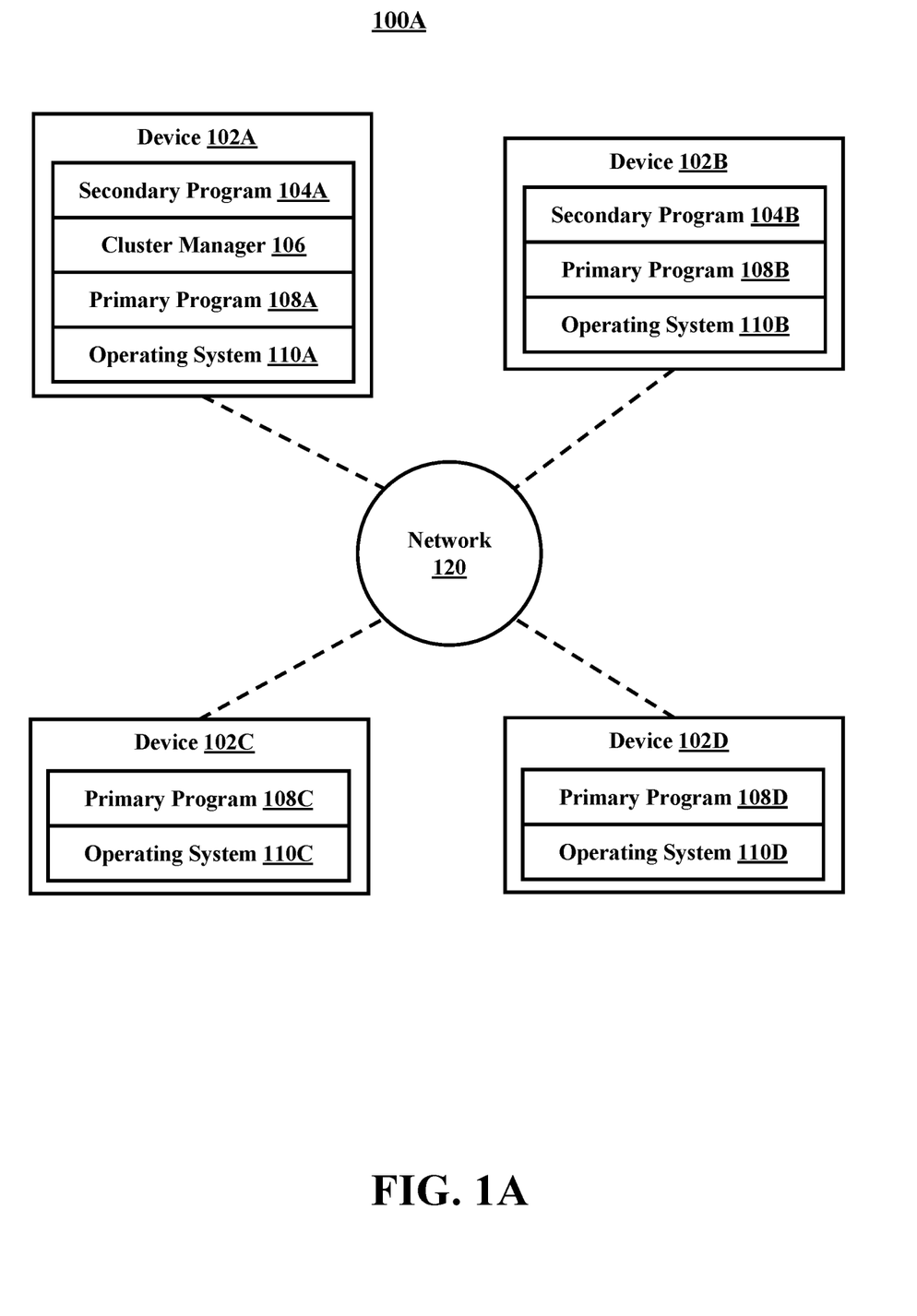
FIG. 1A illustrates a block diagram of an exemplary system for sharing efficient computation among multiple IoT devices using device OS clustering in a first state, in accordance with aspects of the present disclosure.
Figure 1B:
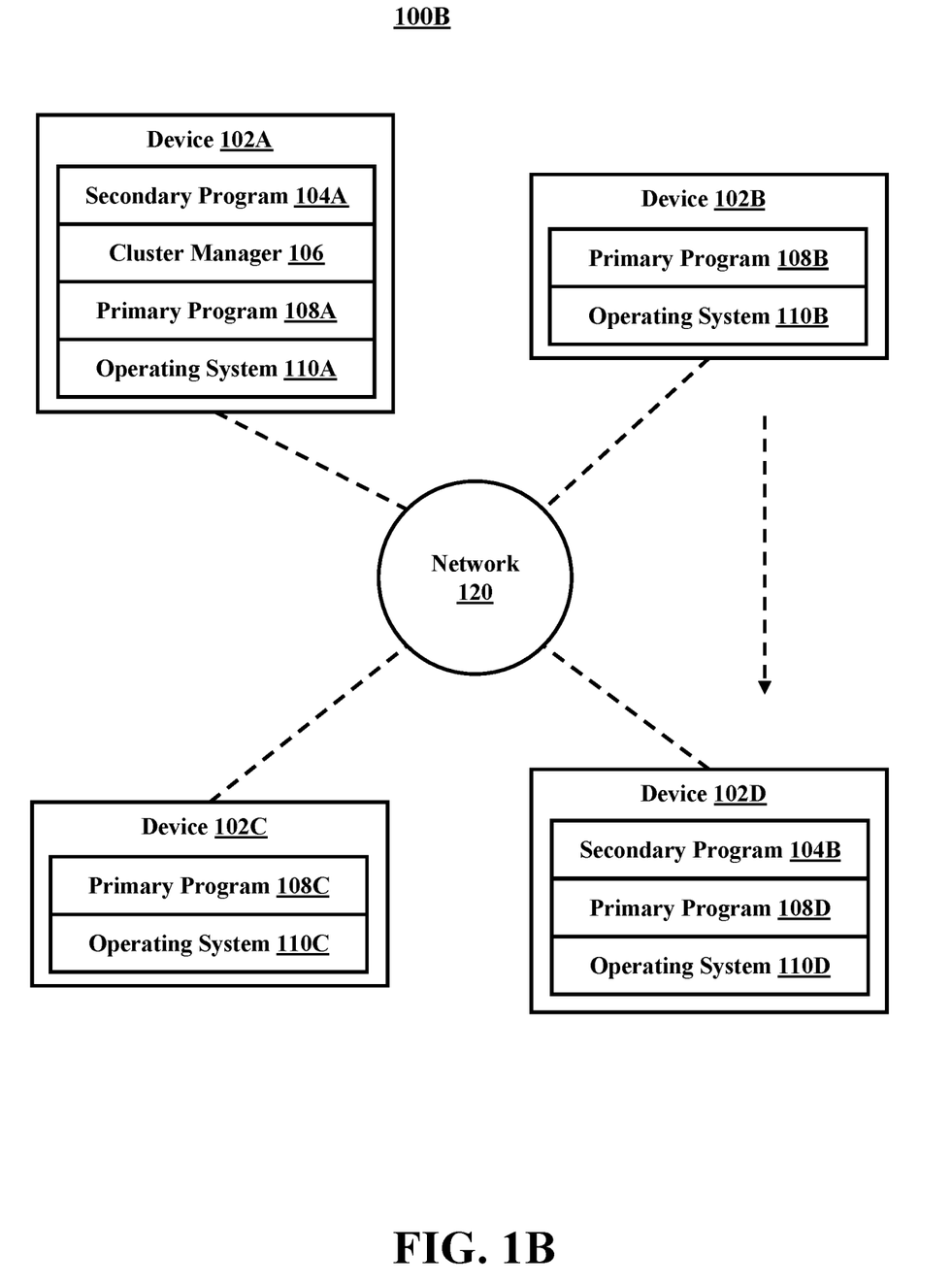
FIG. 1B illustrates a block diagram of an exemplary system for sharing efficient computation among multiple IoT devices using device OS clustering in a second state, in accordance with aspects of the present disclosure.

Referring now to FIGS. 1A and 1B, which illustrate a block diagram of an exemplary system for sharing efficient computation among multiple IoT devices (devices 102A-D) using device OS clustering in a first state 100A and second state 100B, in accordance with aspects of the present disclosure. As depicted, the system 100A includes devices 102A-D, which are member IoT devices and connected to a network 120 through which the devices 102A-D can communicate and/or share computation.

Further, devices 102A-D each include at least a secondary program 104A-B, a cluster manager 106, a primary program 108A-D, and/or an operating system 110A-D. The devices 102A-D may each be loaded with the operating system 110A-D that allows the devices 102A-D to share computations.

In some embodiments, the network 100A utilizes the group of devices 102A-D, which are collectively managed by cluster manager 106, in such a way that the cluster manager 106 tracks an exact instruction (e.g., line of code) of each process (e.g., of the secondary programs 104A-B and/or primary programs 108A-D) that is being executed at any point of time along with the contents of related memory for the process in such a way that any device 102A-D can directly jump to any line of code and start execution with its prerequisite including related memory (e.g., variables data) dependent libraries. In this way, a process (e.g., secondary program 104B, of secondary program 104B, etc.) in mid-execution can be moved from one device (e.g., device 102B) to another device (e.g., device 102D) if it is going offline, or has primary IoT (e.g., primary program 108B) work to perform and can no longer share it's resources, or it has gone offline in a HA setup as aforementioned. Thus, the system shifts from the first state 100A to the second state 100B where the secondary program 104B is efficiently shared/ transferred between devices 102B and 102D.

Accordingly, the ability to perform HA for running any critical program (e.g., primary programs 108A-D and/or secondary programs 104A-D) on multiple devices 102A-D, specifically including the replication of memory and storage synchronously (e.g., including the exact location of instruction processing) while the processes is running so that if a device is unplugged it can continue running in parallel on another device 102A-D is a novel aspect of this disclosed system.

Additionally, the ability to manage the transfer of a running process (e.g., secondary program 104B, of secondary program 104B) mid-execution, and the contents of relevant memory between member devices 102B and 102D based on load, policy, priority, efficiency, processor architecture, etc. based on instruction of the cluster manager 106 is a further novel aspect of this disclosed system.

Another unique benefit of the disclosed system is the ability to establish trust relationships between devices 102A-D in the cluster so that processes at the specific location of processing in memory and the contents of the memory can be securely transferred directly between devices (e.g., 102B and 102D) using the network 120.

Lastly, unique to the disclosed system is the ability for a user to manually request approval for another IoT device to join a processing cluster for the purposes of creating a trust relationship that can execute and migrate live workloads between the devices 102A-D. Or, in some embodiments, the ability for a user in a public environment to subscribe a another device to an organized service where it can automatically join and leave, and potentially be paid for its processing usage over time (e.g., cars in a car parking garage clustering together for a temporary super computer during the day).

Figure 2:
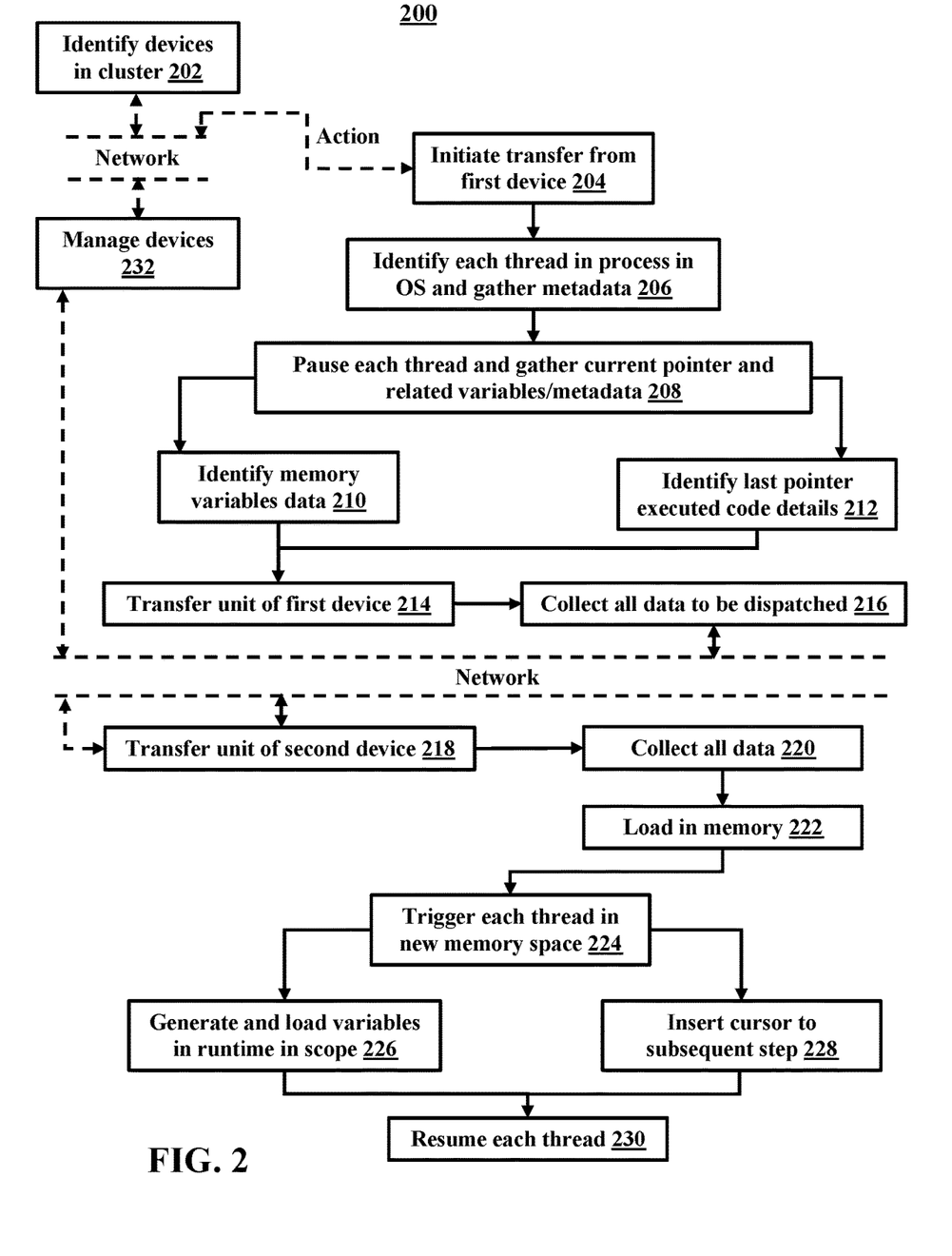
FIG. 2 illustrates a flowchart of an exemplary method for sharing efficient computation among multiple IoT devices using device OS clustering, in accordance with aspects of the present disclosure.

Referring now to FIG. 2, illustrated is a flowchart of an exemplary method 100 for sharing efficient computation among multiple IoT devices using device OS clustering, in accordance with aspects of the present disclosure. In some embodiments, the method 200 may be performed by a processor (e.g., of the system of FIGS. 1A-B, of network 120, of a computing device, etc.).

In some embodiments, the method 200 begins at operation 202, where (IoT) devices are identified in a cluster. In some embodiments, an action (e.g., a primary process needs more computation capacity, a device is shutting down or needs to stop/transfer secondary program, etc.) of a first device of the devices may be identified and the method 200 may proceed to operation 204, where a transfer is initiated from the first device to one or more other devices of the IoT devices.

In some embodiments, the method 200 may proceed to operation 204 after a cluster manager (program) manages devices 232 and recommends initiating the transfer 204. In some embodiments, after operation 204, the method 200 proceeds to operation 206, where each thread in a process in an OS are identified and metadata of the threads are gathered. It is noted that a thread of execution is the smallest sequence of programmed instructions that can be managed independently by a scheduler, which is typically a part of the OS.

In some embodiments, the method 200 proceeds to operation 208, where each thread being executed by the first device and the one or more other devices are paused. In some embodiments, pausing each thread includes gathering a current pointer, related variables, and metadata respectively associated with each thread.

In some embodiments, the method 200 may (simultaneously) proceed to operation 210, where memory variables data is identified, and operation 212, where a last pointer associated with executed code details is identified. In some embodiments, the method 200 proceeds to operation 214, where a (computation) unit (OS) from the first device to the one or more other devices is transferred.

In some embodiments, the method 200 proceeds to operation 216, where data associated with the one of the one or more other devices is collected for dispatch. In some embodiments, the method 200 proceeds to operation 218, where a (computation) unit (OS) from the second device is transferred. In some embodiments, the method 200 proceeds to operation 220, where data from dispatch 216 is collected by the second device.

In some embodiments, the method 200 proceeds to operation 221, where the data is loaded in a memory of one of the one or more other devices (e.g., the second device to find where the thread/process/computation was before transfer). In some embodiments, the method 200 proceeds to operation 224, where each thread is triggered in a new memory space in the one of the one or more other devices (e.g., second device).

In some embodiments, the method 200 proceeds to operation 226, where one or more variables are generated and the one or more variables are loaded in a runtime in a scope. It is noted that variables are used to store information to be referenced and manipulated in a computer program, and that scope refers to an association of a name to an entity, such as a variable. It is the part of a program where the name binding is valid, and where the name can be used to refer to the entity. The term scope can also be used to refer to a set of all name bindings that are valid within a part of a program or at a given point in a program, which is more correctly referred to as context or environment. In some embodiments, the method 200 proceeds to operation 230, where each thread is resumed (at the point where the thread was transferred mid-execution). In some embodiments, after operation 230, the method 200 may end.

In some embodiments, (simultaneously to proceeding to operation 226), the method 200 proceeds to operation 228, where a cursor is generated and inserted in a thread, where the cursor points to a subsequent step in the thread. In some embodiments, the method 200 proceeds to operation 230, where each thread is resumed (at the point where the thread was transferred mid-execution as indicated by the cursor). In some embodiments, after operation 230, the method 200 may end.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
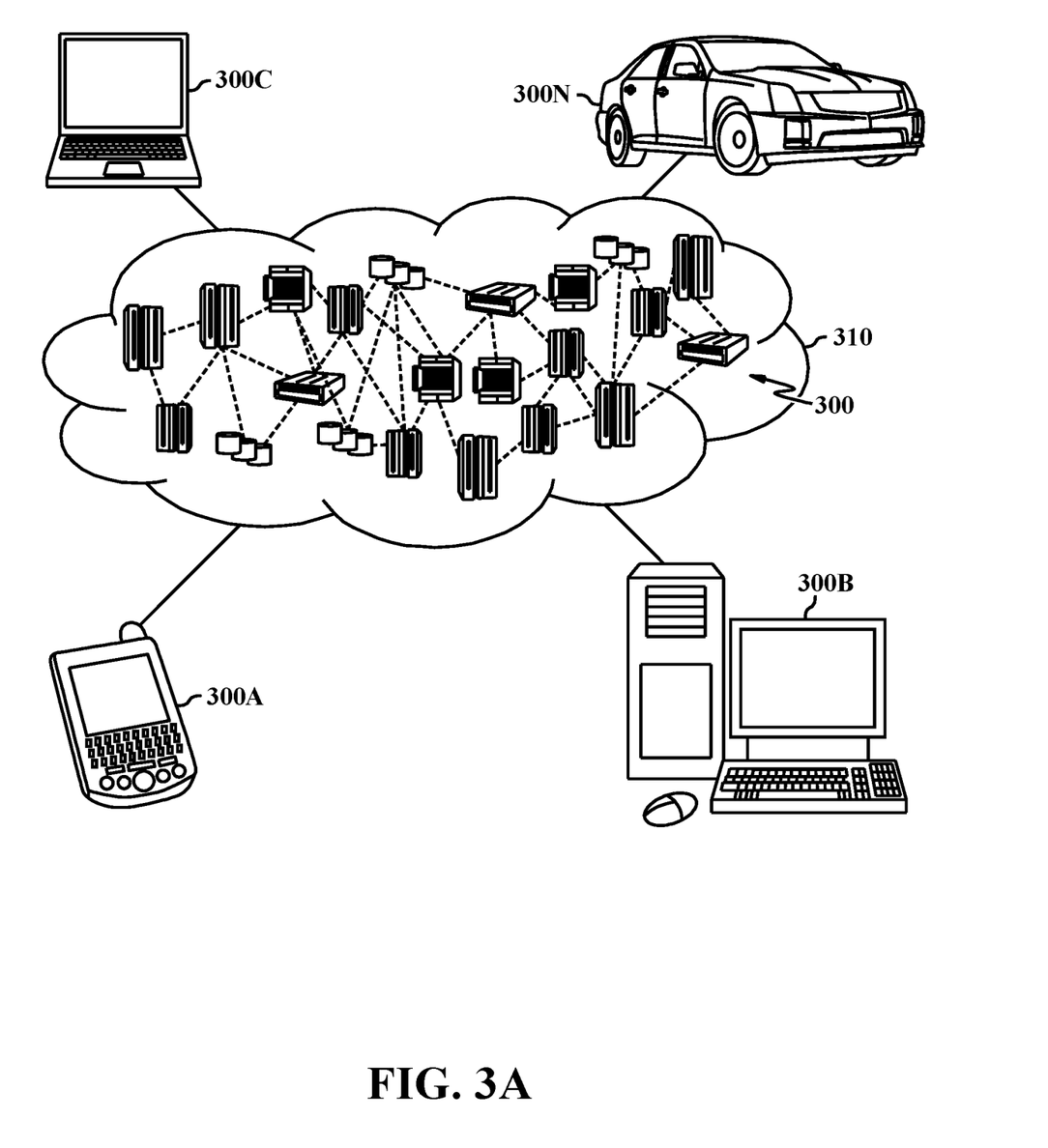
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
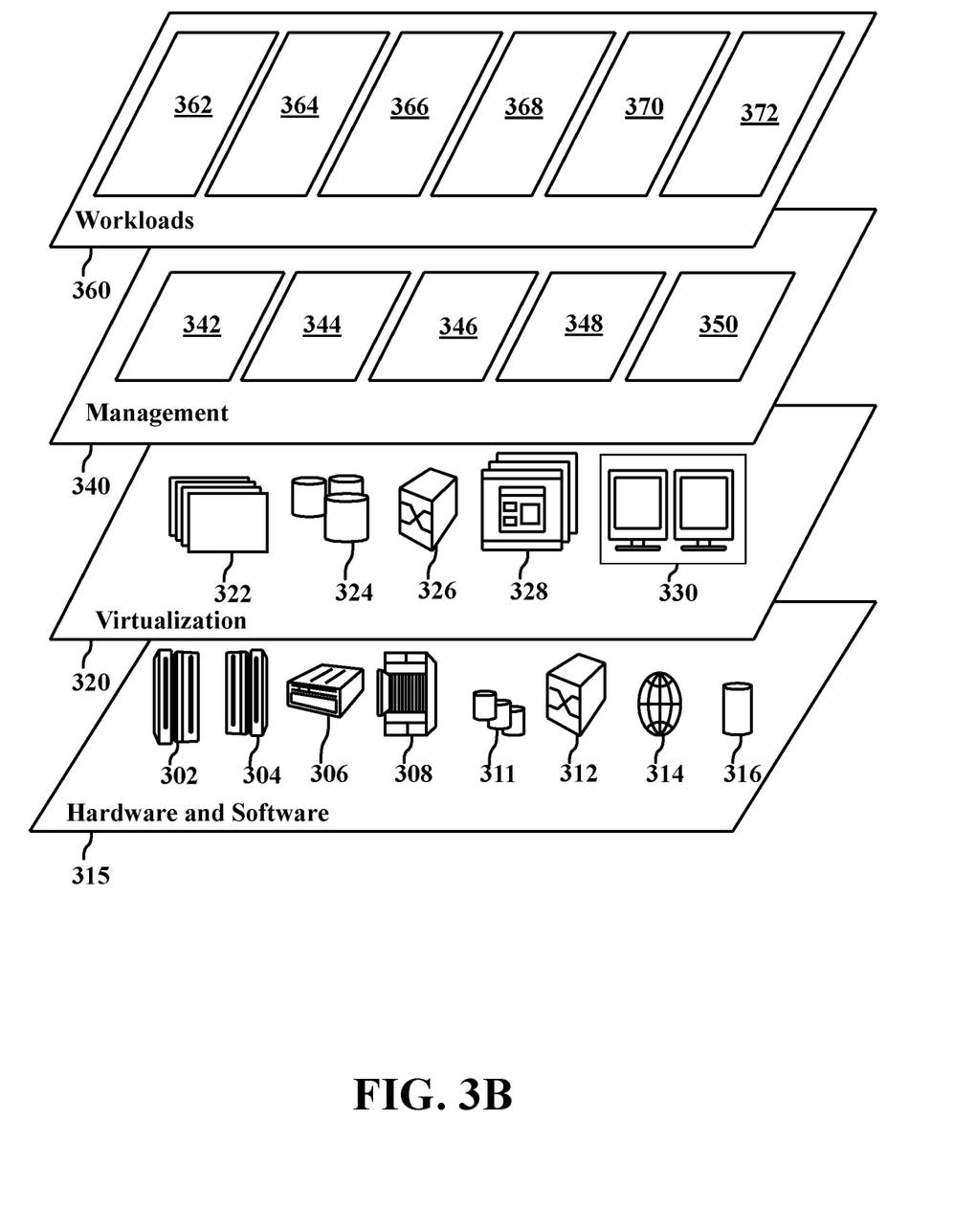
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and efficient computation sharing among multiple IoT devices using device OS clustering 372.

Figure 4:
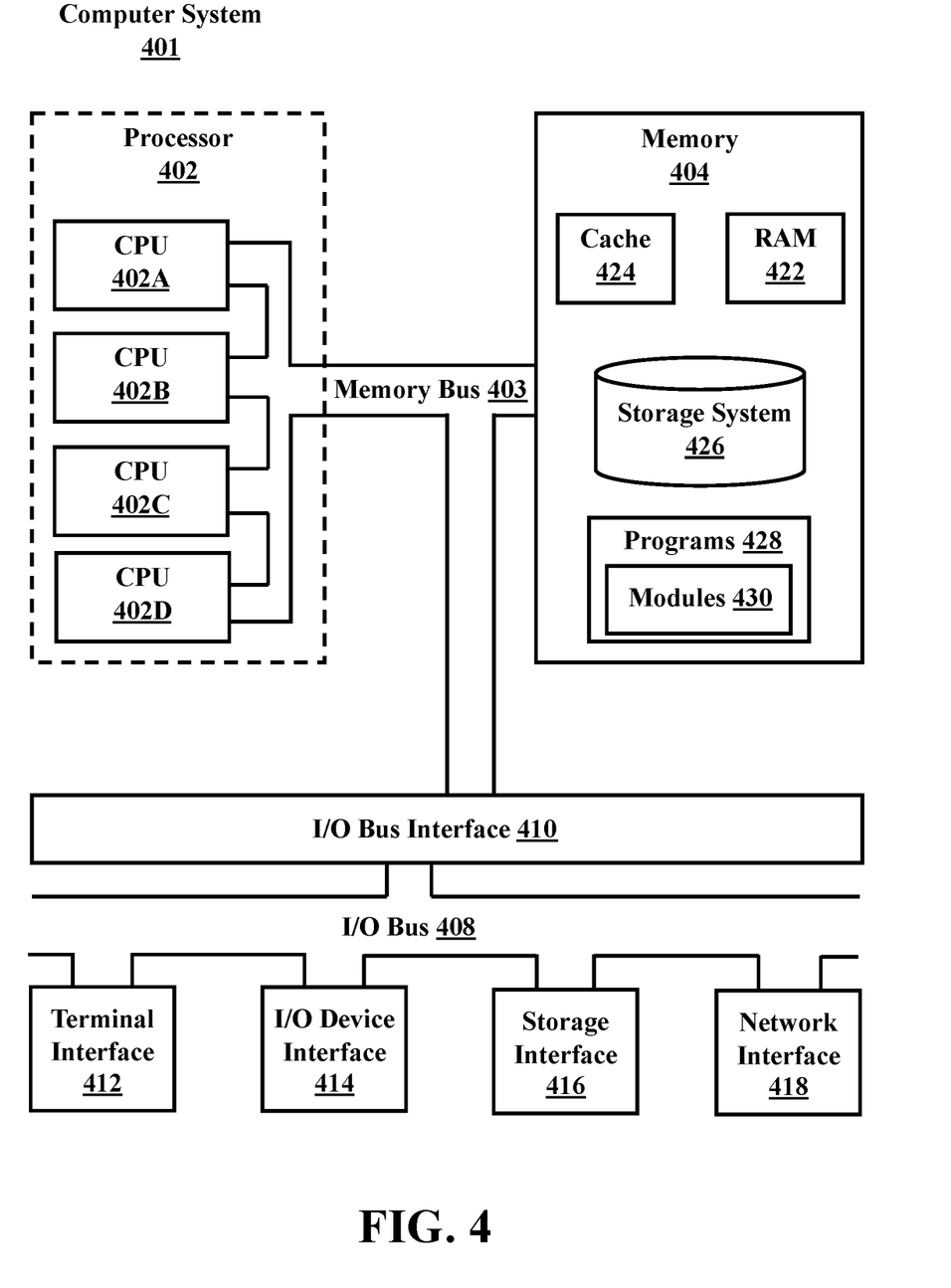
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for sharing efficient computation among multiple Internet-of-Things (IoT) devices using device operating system (OS) clustering, the system comprising:
   a memory; and a processor in communication with the memory, the processor being configured to perform operations comprising:

identifying an action of a first device of the IoT devices;

initiating a transfer of the action from the first device to one or more other devices of the IoT devices;

pausing each thread associated with the action being executed by the first device and the one or more other devices, wherein pausing each thread includes:

gathering a current pointer, related variables, and metadata respectively associated with each thread;

identifying memory variables data;

identifying a last pointer associated with executed code details;

transferring a unit of the action from the first device to the one or more other devices;

transferring a unit OS of one of the one or more other devices;

collecting data associated with the one of the one or more other devices;

loading the data in a memory of one of the one or more other devices; and triggering each thread in a new memory space in the one of the one or more other devices.

2. The system of claim 1, the processor being further configured to perform operations comprising:

generating one or more variables;

loading the one or more variables in a runtime in a scope; and resuming each thread.

3. The system of claim 1, the processor being further configured to perform operations comprising:

generating a cursor;

inserting the cursor in a thread, wherein the cursor points to a subsequent step in the thread; and resuming each thread.

4. A method of sharing efficient computation among multiple Internet-of-Things (IoT) devices using device operating system (OS) clustering, the method comprising:

identifying, by a processor, an action of a first device of the IoT devices;

initiating a transfer of the action from the first device to one or more other devices of the IoT devices, wherein pausing each thread includes:

gathering a current pointer, related variables, and metadata respectively associated with each thread;

identifying memory variables data;

identifying a last pointer associated with executed code details;

transferring a unit of the action from the first device to the one or more other devices;

transferring a unit OS of one of the one or more other devices;

collecting data associated with the one of the one or more other devices;

loading the data in a memory of one of the one or more other devices; and triggering each thread in a new memory space in the one of the one or more other devices.

5. The method of claim 4, further comprising:

generating one or more variables;

loading the one or more variables in a runtime in a scope; and resuming each thread.

6. The method of claim 4, further comprising:

generating a cursor;

inserting the cursor in a thread, wherein the cursor points to a subsequent step in the thread; and resuming each thread.

7. A computer program product for sharing efficient computation among multiple Internet-of-Things (IoT) devices using device operating system (OS) clustering comprising a computer readable storage medium having program instructions embodied therewith, the program instructions executable by a processor to cause the processor to perform operations, the operations comprising:

identifying an action of a first device of the IoT devices;

initiating a transfer of the action from the first device to one or more other devices of the IoT devices;

pausing each thread associated with the action being executed by the first device and the one or more other devices, wherein pausing each thread includes:

gathering a current pointer, related variables, and metadata respectively associated with each thread;

identifying memory variables data;

identifying a last pointer associated with executed code details;

transferring a unit of the action from the first device to the one or more other devices;

transferring a unit OS of one of the one or more other devices;

collecting data associated with the one of the one or more other devices;

loading the data in a memory of one of the one or more other devices; and triggering each thread in a new memory space in the one of the one or more other devices.

8. The computer program product of claim 7, the processor being further configured to perform operations comprising:

generating one or more variables;

generating a cursor;

inserting the cursor in a thread, wherein the cursor points to a subsequent step in the thread;

loading the one or more variables in a runtime in a scope; and resuming each thread.

\* \* \* \* \*